(12) United States Patent
Jarosh et al.

(10) Patent No.: US 7,664,905 B2
(45) Date of Patent: Feb. 16, 2010

(54) PAGE STREAM SORTER FOR POOR LOCALITY ACCESS PATTERNS

(75) Inventors: David A. Jarosh, Santa Clara, CA (US); Sonny S. Yeoh, San Jose, CA (US); Colyn S. Case, Hyde Park, VT (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 378 days.

(21) Appl. No.: 11/592,540

(22) Filed: Nov. 3, 2006

(65) Prior Publication Data
US 2008/0109613 A1 May 8, 2008

(51) Int. Cl.
*G06F 13/14* (2006.01)
(52) U.S. Cl. .......................... 711/5; 711/154; 711/158; 711/165
(58) Field of Classification Search ................ 711/154, 711/5, 158, 165
See application file for complete search history.

(56) References Cited

U.S. PATENT DOCUMENTS

| 4,477,736 A * | 10/1984 | Onishi ........................ 327/543 |
| 2003/0065897 A1* | 4/2003 | Sadowsky et al. ........... 711/165 |
| 2007/0156946 A1* | 7/2007 | Lakshmanamurthy et al. .. 711/5 |

* cited by examiner

*Primary Examiner*—Tuan V Thai
*Assistant Examiner*—Yong Choe
(74) *Attorney, Agent, or Firm*—Townsend and Townsend and Crew LLP (57) ABSTRACT

In some applications, such as video motion compression processing for example, a request pattern or "stream" of requests for accesses to memory (e.g., DRAM) may have, over a large number of requests, a relatively small number of requests to the same page. Due to the small number of requests to the same page, conventionally sorting to aggregate page hits may not be very effective. Reordering the stream can be used to "bury" or "hide" much of the necessary precharge/activate time, which can have a highly positive impact on overall throughput. For example, separating accesses to different rows of the same bank by at least a predetermined number of clocks can effectively hide the overhead involved in precharging/activating the rows.

22 Claims, 3 Drawing Sheets

PAGE STREAM SORTER FOR POOR LOCALITY ACCESS PATTERNS

CROSS-REFERENCES TO RELATED APPLICATIONS

The present disclosure is related to commonly-assigned U.S. patent application Ser. No. 60/872,415, filed on Nov. 2, 2006, entitled "PAGE STREAM SORTER WITH DYNAMIC BINNING," which disclosure is incorporated herein by reference for all purposes.

BACKGROUND OF THE INVENTION

The present invention relates to computer memory interface circuitry in general, and more particularly to the sorting of requests for efficient access to memories.

Memory devices are fast becoming a bottleneck and limiting improvements in computer system performance. Part of this is caused by the relative disparity between the increase in processor as compared to memory speed. That is, while processor speed has continued to increase at the well known rate of doubling every 18 to 24 months, memory access times have not kept pace. This gap means that more efficient use of memory bandwidth must be made in order to reduce the effect of this bottleneck and take full advantage of the improved processor performance.

Data is accessed from a memory by selecting the row and column of one or more memory locations. This is done by asserting specific row and column address signals, referred to as RAS and CAS. The rows in a memory tend to be long traces with many memory cells attached. Accordingly, there is a comparatively long delay when a selected row, or page, is changed. Thus, when a row is selected, it is desirable to continue accessing different columns in that row before selecting another row. This is particularly true if the same bank in the memory is needed.

Memories in computer systems are often made up of multiple dynamic random-access-memory (DRAM) circuits, which may be located in dual-in-line memory modules (DIMMs). These DRAMs are selected using a chip select signal. When changing DRAMs, even if the same row is maintained, there is a delay while a different DRAM is selected.

Page switching overhead (resulting from "page breaks") is inherent in DRAMs. For example in some DRAMs, each bank of DRAM has multiple pages, and to open a page may incur approximately 10 memory cycles after the page is activated. To switch to a second page requires closing the previously opened page and reopening the bank to another page. For example, since there is a non-zero amount of overhead required to change pages, increasing the number of accesses made to a page before switching to another page reduces page switching overhead.

However, in some streams of data requests, the number of accesses made to a page before switching to another page may not be able to be increased significantly. In these circumstances, poorer memory access results due to many page breaks.

Therefore, it is desirable to provide methods and systems for sorting memory requests in which the downtime during these memory breaks can be hidden or buried.

BRIEF SUMMARY OF THE INVENTION

Generally, systems and methods are provided for sorting a stream of memory access requests to enable efficient memory access, where the stream of requests has poor locality. With poor locality, the stream of requests has a relatively small number of requests to the same page so that conventional techniques for finding and aggregating page hits may be ineffective. Systems and methods provided herein thus reorder the stream in a manner that "hides" or "buries" the necessary switching overhead (e.g., precharge/activate time) as much as possible. For example, separating accesses to different rows of the same bank by at least a predetermined number of clocks can effectively hide the overhead involved in pre-charging/activating (page switching) the rows, if other useful work can be found to fill in the required time. Performing read or write accesses to one bank while another bank performs page switching is one such useful work.

A "stream" as used herein, for example in the phrase a "stream of requests" is intended to encompass continuous requests (e.g., no time lag between successive requests), requests overlapping in time (e.g., requests received from multiple clients), requests separated in time by one or more periods of inactivity or other activity, and so on, and is not to be limited to an orderly, continuous flow or succession of requests. A "stream" of requests does not necessarily require (but may allow) an continuous succession of requests.

In one exemplary embodiment, a method of reordering memory access requests is provided. A stream of requests to access a memory is received. The memory has multiple banks, and each bank has multiple pages. The requests are buffered a number of bins. In one aspect, each bin corresponds to one bank. In another aspect, the buffering is based on a bank to be accessed by a request. In one embodiment, a determination is made of the bank associated with a request, and that request is buffered in the associated bin. The requests are output from one or more of the bins to an arbiter coupled to the memory. At least once, the order that the requests are output is such that data within one bank is being accessed while at least one other bank is undergoing a page switch. In one embodiment, the order is such that at least one bank is always undergoing a page switch. This page switching of a bank is often occurring when data is being accessed by another bank.

In one embodiment, one or more requests, which access the same page of a bank, are output from one bin until another request that accesses a different page is detected in the one bin. After detecting this request, another bin is accessed and one or more requests from the other bin are output. The request that accessed a different page may be detected from a marker that was inserted into the bin, e.g., during the buffering process. In one aspect, the next bin that is accessed is chosen based on a cyclical ordering of the bins, such as a round robin pattern. In another aspect, the next bin is chosen based on an elapsed time since a request was last output from the second bin.

In another embodiment, one or more requests are output from a first bin until a number of requests in the first bin falls below a predetermined number and an elapsed time since a request was last output from a second bin is larger than a predetermined time. In one aspect, all of the requests output from the first bin access the same page. In another embodiment, prior to buffering the requests, one or more requests are re-mapped such that the requests are more evenly distributed among the bins.

In another exemplary embodiment, a system includes: a memory with multiple banks, each having multiple pages; an arbiter coupled to the memory; and a page stream sorter coupled to the arbiter. The page stream sorter is configured to receive a stream of requests to access the memory, to buffer the requests into bins based on a bank to be accessed by a request, and to output requests from one or more of the bins to an arbiter coupled to the memory. At least once, the requests are output in an order that enables data in one bank to be accessed while at least one other bank is undergoing a page switch.

In one embodiment, the page stream sorter is configured such that successive groups of one or more requests are output. Each request of a group accesses the same page of a bank, and each group output accesses a different bank than the last group output. In another embodiment, the page stream sorter is configured to output requests until a page break is encountered and then to output requests from another bin. The page stream sorter also may be configured to re-map the one or more requests such that the requests are more evenly distributed among the bins. In another embodiment, the system includes a graphics processor, and the stream of requests includes requests from the graphics processor to access textures stored in the memory.

In another exemplary embodiment, another method of reordering memory access requests is provided. A stream of requests to access a memory is received. The memory has multiple banks, and each bank has multiple pages. The requests are buffered a number of bins. In one aspect, the buffering is based on a bank to be accessed by a request. Successive groups of one or more requests are output from one or more of the bins to an arbiter coupled to the memory. Each request of a group accesses the same page of a bank, and each group output accesses a different bank than the last group output.

In one embodiment, a percentage of memory clocks during which data is transferred to or from the memory is maximized. In another embodiment, a first successive group that accesses a first bank is output from a first bin based on a page break being detected in a second bank. In one aspect, a successive group from each bin is output before another request is output from the first bin. In another embodiment, the method further includes sending a first page switching signal to a first bank before sending a second successive group of requests to a second bank.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

In some applications, such as video motion compression processing in a graphics processor for example, a stream of requests may have, over a number of requests, a relatively small number of requests to access a given page in memory. Because of the small number of requests to the same page, sorting to aggregate page hits in a conventional fashion may not be very effective. Even if the stream is sorted to find and aggregate requests to successively access the same page, with relatively few requests to each page, page switching will not necessarily be reduced or "buried".

In such applications with a relatively small number of requests to the same page, reordering the stream in a manner that "hides" or "buries" the necessary switching overhead (e.g., precharge/activate time) as much as possible can have a highly positive impact on overall throughput. For example, separating accesses to different rows of the same bank by at least a predetermined number of clocks can effectively hide the overhead involved in precharging/activating the rows when data is accessed in another bank during the interim time between the separate accesses.

Exemplary System Architecture

Figure 1:
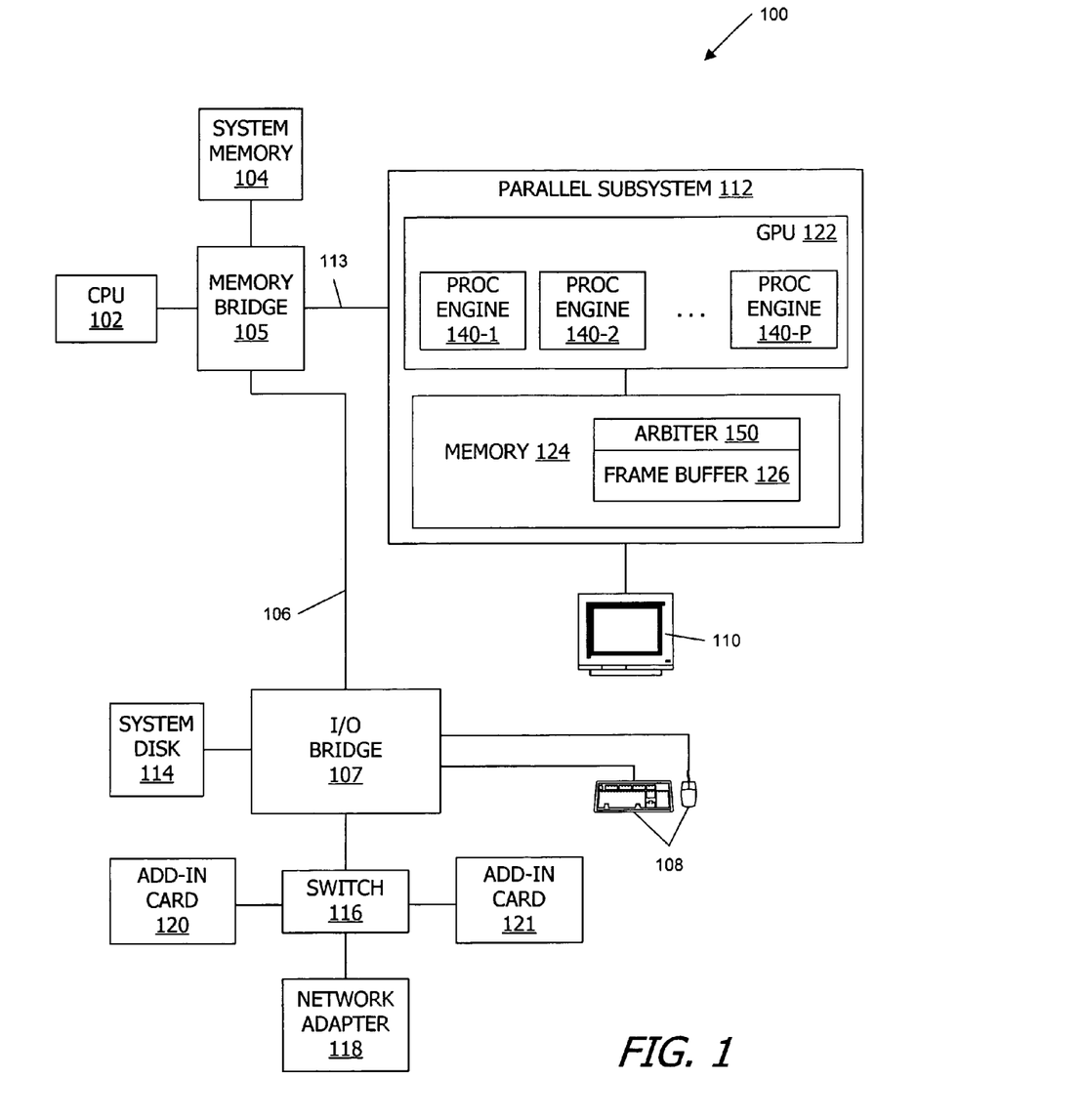
FIG. 1 is a block diagram of a computer system 100 according to one embodiment.
Figure 2:
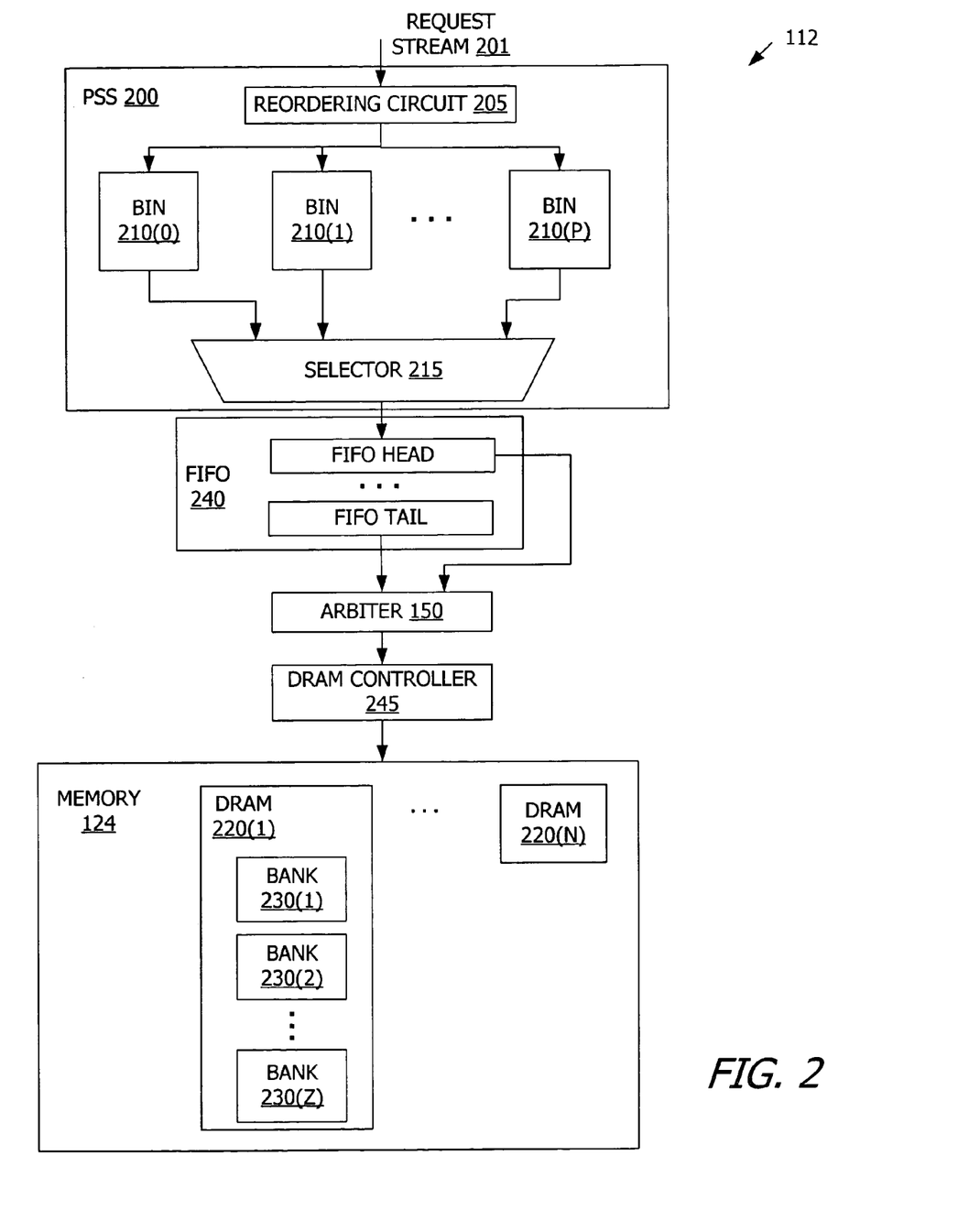
FIG. 2 illustrates a page stream sorter 200 for reordering a stream of requests 201 in processing subsystem 112 of FIG. 2, in one embodiment in accordance with the present invention.
Figure 3:
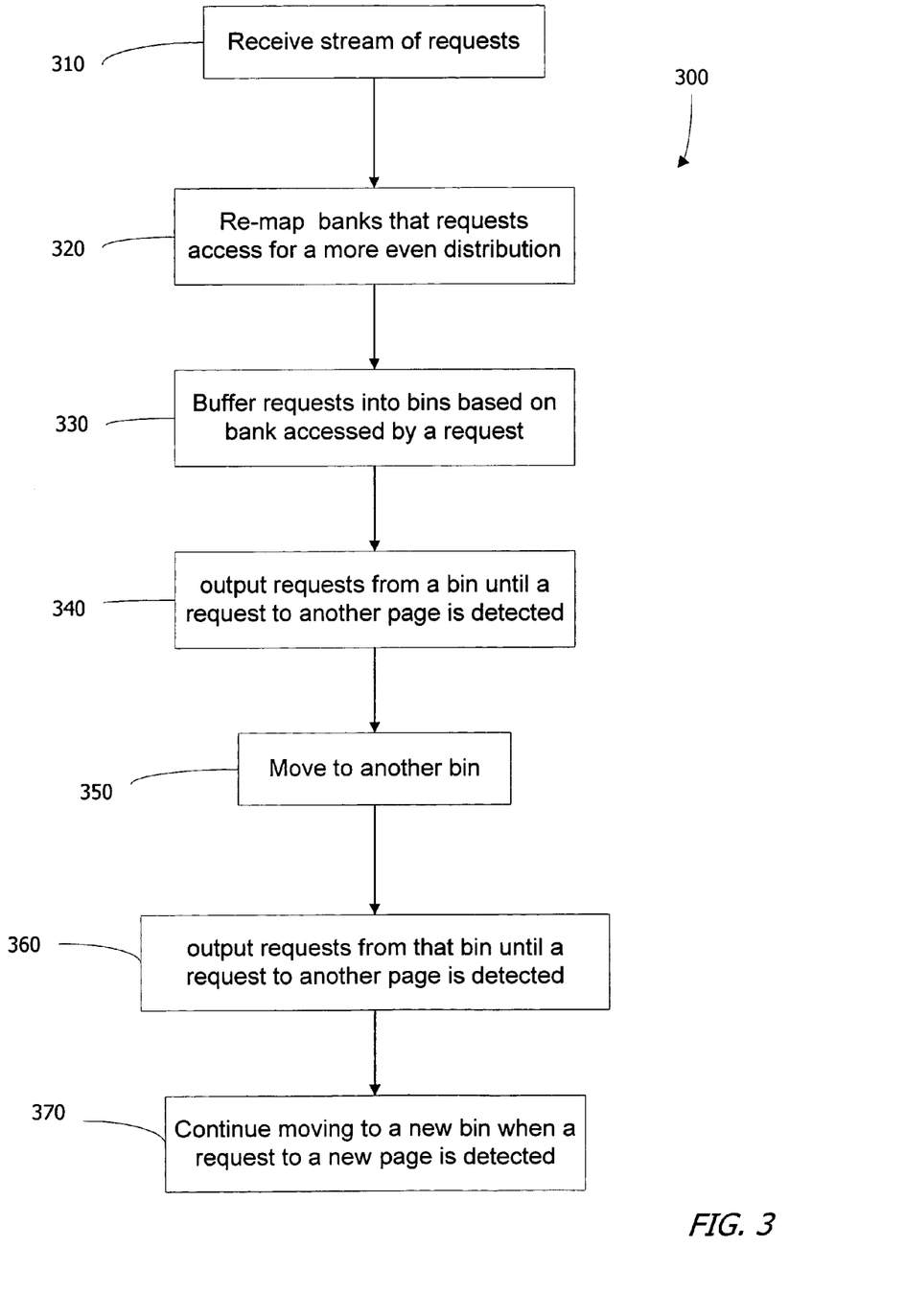
FIG. 3 illustrates a method 300 of ordering requests according to an embodiment of the present invention.

FIGS. 1 through 3 illustrate exemplary computer processing architectures in which systems and methods for reordering a stream of requests to memory (e.g. DRAM) can be used to hide switching overhead. However, the systems and methods disclosed herein are not limited to any particular processing architecture. For example, the architecture described herein includes a computer system with a central processing unit (CPU) and a parallel or graphics processing unit (GPU) that supports parallel processing applications. However, the methods described herein are not limited to application on a GPU and instead are broadly applicable to virtually any device.

FIG. 1 is a block diagram of a computer system 100 according to one embodiment. Computer system 100 is merely exemplary, and a number of alterations may be made to computer system 100. Computer system 100 includes a central processing unit (CPU) or control processor 102 and a system memory 104 communicating via a communications path that may include a memory bridge 105. CPU 102 operates as the control processor of system 100, controlling and coordinating operations of other system components. Memory bridge 105 (e.g. a Northbridge chip) is connected via a communication path 106 (e.g., a point-to-point connection using the HyperTransport protocol) to an I/O (input/output) bridge 107. I/O bridge 107 (e.g. a Southbridge chip) receives user input from one or more user input devices 108 (e.g., keyboard, mouse) and forwards the input to CPU 102 via communication path 106 and memory bridge 105. Visual output may be provided on a pixel based display device 110 (e.g., a CRT or LCD based monitor) operating under control of a parallel or graphics subsystem 112 coupled to CPU 102 or memory bridge 105 via communication path 113, which may be implemented using, e.g., PCI Express (PCI-E), HyperTransport, or any other point-to-point or interconnect protocol. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or interconnect protocol(s), and connections between different devices may use different protocols as is known in the art.

Parallel processing subsystem 112 includes a number N of parallel or graphics processing units (PPU or GPU) 122 and memories 124, which may be implemented, e.g., using one or more integrated circuit devices such as programmable processors, application specific integrated circuits (ASICs), and memory devices. Each GPU 122 may execute general parallel processing applications, or be configured to perform various tasks related to generating pixel data from graphics data supplied by CPU 102 and/or system memory 104 via memory bridge 105 and bus 113, interacting with memory 124 to store and update pixel data, and the like. For example, GPU 122 may generate pixel data from 2-D or 3-D scene data provided by various programs executing on CPU 102, and may read data from or write data to frame buffer 126 in memory 124.

In some embodiments, PPU 122 includes P parallel processing engines 140-1 to 140-P (collectively, processing engines 140) configured to execute multiple threads in parallel. For example, during a rendering operation, each of the multiple parallel threads might be an instance of a vertex shader program executing on attributes of a single vertex, or an instance of a pixel shader program executing on a given primitive and pixel. During general-purpose computing, each of the multiple parallel threads might be an instance of a program executing on a portion of an input data set and/or producing a portion of an output data set.

Other components (not explicitly shown), including USB or other port connections, CD drives, DVD drives, and the like, may also be connected to I/O bridge 107. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, parallel system 112 is implemented as an add-in card that can be inserted into an expansion slot of system 100. In other embodiments, a GPU is integrated on a single chip with a bus bridge, such as memory bridge 105 or I/O bridge 107.

A PPU may be provided with any amount of local memory, including no local memory, and may use local memory and system memory in any combination. For instance, in a unified memory architecture (UMA) embodiment, no dedicated graphics memory device is provided, and the PPU uses system memory exclusively or almost exclusively. In UMA embodiments, the PPU may be integrated into a bus bridge chip or provided as a discrete chip with a high-speed bus (e.g., PCI-E) connecting the PPU to the bridge chip and system memory.

It is also to be understood that any number of PPUs may be included in a system, e.g., by including multiple PPUs on a single graphics card or by connecting multiple graphics cards to bus 113. Multiple PPUs may be operated in parallel to generate images for the same display device or for different display devices. In addition, PPUs embodying aspects of the present invention may be incorporated into a variety of devices, including general purpose computer systems, video game consoles and other special purpose computer systems, DVD players, handheld devices such as mobile phones or personal digital assistants, and so on.

Page Stream Sorter for Poor Locality Access Requests

In some applications, such as video motion compression processing on PPU 122, a stream of requests to memory 124 may have, over a large number of requests, a relatively small number of requests to the same page. For example, in a 3-D graphics operation executed on PPU 122, processing engines 140 may request access to two (or more) textures in memory 124 in order to draw graphics on display device 110.

The stream of requests may access the same bank but different pages in memory 124. For example, in order, the accesses may be to page0bank0, page1bank0, page2bank0, and so on. With such a stream of requests, there is relatively little "locality" in the stream (e.g., successive requests access different pages in the same bank, or a relatively small number of requests to the same page over a number of requests, and so on). In such applications, conventional algorithms for page stream sorting, such as sorting to find and aggregate page hits, may not be very effective.

However, for applications with a relatively small number of requests to the same page, reordering the stream can be used to hide as much of the necessary page switching overhead (e.g., precharge/activate time) as possible, which can have a highly positive impact on overall throughput.

FIG. 2 illustrates a page stream sorter 200 for reordering a poor locality stream of requests 201 in processing subsystem 112 of FIG. 2, in one embodiment in accordance with the present invention.

As shown, memory 124 comprises a number N of DRAMs 220 (N may be any number, e.g., four or eight), where each DRAM 220 includes a number Z of banks 230 (Z may be any number). Memory 124 can also be organized in pages (not shown) and/or rows and columns (not shown). Note that although memory devices are described as "DRAM," the memory type may include DRAM, SRAM, flash, any other memory type, and/or combinations of such memory types and still maintain the spirit of the invention.

In overview, page stream sorter 200 is configured to reorder the stream of requests 201 received (e.g. from PPU 122), buffer and aggregate reordered requests in a number (P+1) of "bins" 210, and output from bins 210 in an order that spreads accesses across different banks of memory 124 as much as possible. By spreading accesses across different banks of memory 124, page stream sorter 200 can hide switching overhead (e.g., precharge/activate time) and capitalize on the fact that memory 124 is typically organized into banks 230 of DRAM 220. In one aspect, the number (P+1) of bins 210 is equal to the number of banks, each bin corresponding to one bank. In another aspect, more than one bin may correspond to a bank, and more than one bank may correspond to a bin.

As opposed to some conventional techniques for page stream sorting that attempt to minimize bank conflicts, page stream sorter 200 attempts to hide page or bank conflicts by reordering the stream of requests. Page stream sorter 200 does not necessarily reduce the number of page or bank switches, but rather attempts to hide the overhead incurred from page or bank switches to yield higher efficiency.

Page stream sorter 200 includes an input reordering circuit 205 configured to receive request stream 201. Input reordering circuit 205 also determines, for each request, a page or bank to be accessed by the request.

A number of bins 210 (e.g., eight bins 210(0) to 210(7)) provides buffer space for the requests. The number of bins 210 may be fixed to equal the number of banks 230 available in memory 124. For example, with eight banks 230 in memory 124, eight bins 210 may be provided (e.g., each bin 210 may be configured to buffer eight requests). In another embodiment, the number of bins corresponds to the number of pages in the DRAM. In one aspect, there is a bin for each page/bank combination. When there is a bin for each page/bank combination, the bins for pages of the same bank may be grouped together, organized, or tracked such that requests from another bank may be selected from the next bin.

As each request of request stream 201 is received by input reordering circuit 205, the request is buffered in the appropriate bin 210 that corresponds to the page or bank number to be accessed by the request. Within any embodiment, the size and number of bins may be dynamically created, e.g., based on the request stream. In one aspect, all of the bins are created from a common pool of storage. Alternatively, the bins may be pre-created for every configured bank or page/bank combination.

For example, reordering circuit 205 may determine that a request will access bank 230(2), and may buffer the request in bin 210(2) associated with bank 230(2). In some embodiments, reordering circuit 205 does not look at page or row number of a request, and requests to different rows in banks 230 may be mixed within one of the bins 210. Thus, each bin 210 can aggregate a predetermined number of requests (e.g., eight) to access a given bank 230. In one embodiment reordering circuit 205 does look at row (page) number, and upon encountering a new row, a marker is placed in the bin to indicate that a page switch is required between the accesses adjacent to the marker. In one aspect, reordering circuit 205 may include a sub-circuit for each bin.

A selector 215 (e.g. multiplexer or crossbar) is configured to select which of bins 210 to output to arbiter 150, and in what order. Output from selector 215 is buffered in FIFO 240, which may include 16 entries for example. Note that FIFO 240 is not limited to any particular number of entries.

Requests that have propagated through FIFO 240 to the FIFO tail are provided to arbiter 150. Once arbiter 150 determines to service a request, arbiter 150 and DRAM controller 245 generate appropriate control signals (address information, DRAM bank precharge signals, DRAM row select signals, and the like) to one or more memory devices (e.g. DRAMs 220-1 to 220-N) of memory 124.

FIFO 240 may be configured to have a "length" corresponding approximately to or larger than the time needed to mask switching overhead in memory 124. For example, FIFO 240 may be sufficiently deep to hide the overhead required to open and close pages in memory 124.

In some embodiments, the request at the head of FIFO 240 is provided to arbiter 150. Where FIFO 240 includes 16 entries, the request at the FIFO head is 16 requests in the future relative to the request at the FIFO tail, from the perspective of arbiter 150. More generally, the number of entries included in FIFO 240 determines how far in the future the FIFO head is relative to the FIFO tail.

By providing the request at the FIFO head to arbiter 150, arbiter 150 can determine, for example, that at a time 16 requests in the future a certain request currently at the FIFO head will access bank 230(7). If none of the requests in front of this certain request access 230(7) then, arbiter 150 and DRAM controller 245 can thus initiate bank switching functions for bank 230(7) based upon the request at the FIFO head, ahead of receiving the actual request. This is because "banks" in a memory controller operate independently. The memory controller can tell one bank to "precharge" while it is telling another bank to send its data. Only one bank can send data at a time but all the banks can be undergoing different bank state changes simultaneously.

By the time arbiter 150 receives the request (after the request has propagated through FIFO 240 to the tail), bank switching activities for bank 230(7) will likely have been completed, such that the penalty (overhead) for bank switching is hidden by other requests. By providing the request at the head of FIFO 240 to arbiter 150, arbiter 150 knows that a page switch may be coming in the future and respond to other requests in the interim.

Arbiter 150 is thus configured to open and close pages in the background based on the head of FIFO 240. As long as other requests to the same bank are not already within FIFO 240, by the time a request has propagated through FIFO 240 and appears at the tail of FIFO 240, the corresponding page has already been opened by arbiter 150 and DRAM controller 245. Thus, even though a stream 201 may be so disordered that page breaks are somewhat inevitable, page stream sorter 200 is configured to order the requests such that, during the time arbiter 150 is creating page breaks in memory 124 based on the request at the head of FIFO 240, arbiter 150 is also performing other useful work for requests in FIFO 240, such as memory accesses to other banks.

Selection of Bins to be Output to Arbiter 150

In a conventional scheme, with request stream 201 including sequential accesses to page0bank0, page1bank0, page2bank0, for example, accessing bank0 to sequentially service the request stream would incur several page breaks and would be very expensive in terms of page switching overhead. In contrast, selector 215 is configured to spread accesses across different banks 230 as much as possible, to hide switching overhead. For example, request stream 201 may include sequential accesses to page0bank0, page1bank0, page2bank0, page0bank1, page1bank1, page2bank1, page0bank2, page1bank2, and page2bank2.

Rather than servicing requests in the order received, which would incur a large number of page breaks and associated overhead, selector 215 is configured to select from bins 210 in an order that allows one bank to be accessed while another bank undergoes page switching. For example, selector 215 selects from bins 210 to reorder the stream to result in accesses, in order, to page0bank0, page0bank1, page0bank2, page1bank0, page1bank1, and so on, to allow banks 1 and/or 2 to page switch while page0bank0 is being read out. This may be accomplished by arbiter 150 choosing to submit a page switch signal to banks 1 and/or 2 prior to sending an access signal to bank 0 (for page 0). Arbiter 150 may send the page switch signal based on a signal from the FIFO head. In one aspect, one or more requests to page0bank0 that are buffered in bin 210(0) are output to FIFO 240 until a page break in the requests bin 210(0) is detected. After that, one or more requests from another bin are output to FIFO 240.

In some embodiments, selector 215 is configured to select bins 210 for output to arbiter 150 in an order based on when the bin 210 was last used. Since there is relatively little locality in request stream 201, there may be only one or two requests in each bin 210. Rather than waiting for each bin 210 to fill completely before emptying the bin, selector 215 is configured to select bins 210 for output by "round robin" rotation among bins 210, to select the bin that was last recently output and maximize the number of accesses to the same page within that bin.

Round robin selection of bins 210 may include reading from a bin 210 until a page break is found, and then selecting another bin 210, to allow a maximum amount of time to transpire before the same bank is accessed. For example, selector 215 may output from bin 210(0) one or more requests to the same page of bank 230(0) of DRAM 220(1), which requires precharging that page of bank 230(0), and incurs some amount of "dead time" before bank 230(0) can be accessed again. While bank 230(0) is unusable, selector 215 may output from bin 210(1) a request to bank 230(1), then from bin 210(2) a request to bank 230(2), and so on.

In such fashion, selector 215 reorders request stream 201 by outputting from bins 210 so that a maximum amount of time has elapsed before a bank is again accessed, which allows time for the precharge/activate (page switching) time of a given bank to be hidden by accesses to other banks. Selector 215 reorders output from bins 210 so that, once a first bank (e.g., bank 210(0) associated with bin 210(0)) is accessed, other bins are accessed in a round robin pattern so that the first bank 210(0) is not accessed again for as long as possible. In one aspect, the round robin pattern results in a cyclical ordering of the bins to be accessed.

In one embodiment, requests of a bin may be output until an event is detected. In one aspect, the event may be that the bin is empty. For example, where there are separate bins for each page/bank combination, a bin may be completely emptied. In another aspect, the event may be that a page break is encountered as described above. In another aspect, the event may be that the number of requests in a bin equals a predetermined number. Thus, if a bin is close to emptying, then another bin may be chosen based on any of the criteria for choosing another bin as described herein.

In some embodiments, an interval timer is provided for each bank 210. The interval timer may be used to compare elapsed time between outputting requests from one of bins 210. For example, if bin 210 currently being emptied is almost empty, and if a sufficient interval has elapsed since a second bin 210 was last read, selector 215 could switch to the second bin 210 to force a page switch, even if there was no page change in the first bin 210.

The interval timers can improve memory 124 efficiency by preventing bins 210 from unnecessarily "running dry" (being completely empty) when bank usage is uneven. This improved memory efficiency can occur even though the number of page precharges/activates is increased. As long as enough bins 210 are non-empty, page precharges/activates have no performance cost. For instances where many requests to the same page appear consecutively in the same bin, a latency timer may also be used to cause the requests of another bin to be output so that other requests do not have to wait too long.

In another embodiment, circuitry (not shown) may be included in page stream sorter 200 to determine a number of requests that have issued to all other banks since a previous access to a first bank of a plurality of banks of memory. Unless the number of requests that have issued after the previous access exceeds a predetermined (e.g., programmable) value, requests to the first bank are prevented from issuing. In some embodiments, a relatively large number of bins (e.g., 16-24) may be included to improve effectiveness of reordering the stream.

Accordingly, page stream sorter 200 is advantageously used where there are a large enough number of banks 230 that accessing each bank in order allows the overhead involved in opening and closing a bank to be hidden. In some embodiments, there may not be a large enough number of banks 230 to hide the overhead. For example, where memory 124 only includes two banks 230, there may not be a sufficient number of banks to allow overhead of opening and closing banks to be hidden. In such embodiments, page stream sorter 200 may include one or more conventional mechanisms for aggregating requests to reduce page or bank switches.

Intentional Scattering of Request Stream

In some embodiments, input reordering circuit 205 may include re-mapping circuitry configured to make received request stream 201 even less localized than it would otherwise be. For example, in some applications, the order of the requests is not scattered enough such that there is a relatively high amount of locality, particularly with respect to banks, in the request stream but perhaps not enough locality that a conventional page stream sorter may be effective, e.g., not enough page locality.

In such case, the stream of requests 210 can be intentionally distributed (swizzled) among different pages and/or banks by input reordering circuit 205 to further reduce the locality of the stream by distributing (scattering) the request stream 201 among pages or banks. In one aspect, the mapping between addresses and banks is deterministically changed to make the distribution of requests to banks/bins more even. Including re-mapping circuitry can improve the operation of page stream sorter 200, since if received request stream 201 is maximally distributed (minimally localized) among pages or banks in memory 124, the more efficient the hiding of overhead such as precharge/activate time. Requests that would have all been to the same bank/bin without swizzling, are in different banks after swizzling. In one aspect, less significant address bits determine the bank/bin.

In still further embodiments, input reordering circuit 205 is configured to create artificial requests and/or artificial page breaks for storage in bins 210. In some applications, request stream 201 is not sufficiently distributed and some bins 210 might be more full than others (e.g., a number of requests are buffered for page0bank0 in bin 210(0) and for page1bank0 in bin 210(1), but few requests are buffered to page0bank1 or page1bank1). A re-mapping circuit can re-map the memory requests such that the bins are more evenly buffered.

FIG. 3 illustrates a method 300 according to an embodiment of the present invention. All of the steps are not required and some steps may occur in a different order than that presented as would be known to one skilled in the art. In step 310, a stream of requests to access a memory is received. The memory has multiple banks, and each bank has multiple pages. In step 320, the banks that requests access are re-mapped for a more even distribution of the banks among the requests.

In step 330, the requests are buffered into the bins based on a bank to be accessed by a request. In step 340, requests are output from a bin until a request to another page is detected. In another aspect, requests are output until too few of a number of requests are in that bin and if another bin has not output a request for a predetermined amount of time. In step 350, another bin is accessed. In one aspect, this bin is chosen based on the round robin pattern described above. In another aspect, this next bin is chosen based on an elapsed time that has transpired since a request was last output from the bin. This next bin may be the bin that has not had a request output for the longest period of time.

In step 360, requests from that next bin are output until a request to another page is detected. In step 370, movement to a new a new bin is continued when a request to a new page is detected in the current bin being accessed. In this manner, page switching requests from FIFO head of FIFO 240 can be sent to other banks before requests received from FIFO tail are sent to a bank. Thus, the other banks can perform page switching while a bank is having its data accessed. Accordingly, when the requests to the other banks are received from the FIFO tail, the other banks will be ready after having already performed a switch to the appropriate page.

Feedback into Page Stream Sorter

In some embodiments, feedback regarding the status of memory 124 may be included in page stream sorter 200, arbiter 150, and/or DRAM controller 245. For example, the feedback may include status information indicating that a particular page is ready to close, or that a bank 230 is ready to be opened to another page. This feedback may be used to choose the next bin from which to output requests.

In some embodiments, DRAM controller 245 keeps track of penalties for pages and banks of memory 124 and includes predictive logic (not shown) configured to determine such information as how soon in the future a page and/or bank may be opened again. For example, if DRAM controller 245 has just issued a precharge to close bank 0, the predictive logic can determine how long it may take before bank 0 can be opened again.

Other Embodiments

In various embodiments, one or more "page hit aggregating" page stream sorters (configured to sort requests to find and aggregate page hits) may be included or incorporated into page stream sorter 200 described with respect to FIG. 2. Such page hit aggregating page stream sorters are described in co-pending U.S. patent application Ser. No. 10/969,683, filed Oct. 19, 2004, entitled "Page Stream Sorter for DRAM Systems," the disclosure of which is incorporated by reference herein as if set forth fully.

In some embodiments, a single "second stage" page hit aggregating page stream sorter is located between selector 215 and FIFO 240 of FIG. 2. The second stage page hit aggregating page stream sorter in combination with the first stage page stream sorter addresses interleaved page hits when the distribution of requests to bins is uneven. However, because requests are reordered to be scattered among banks (as buffered in bins 210), the second stage page hit aggregating page stream sorter may be unlikely to find requests to the same bank/page that can be grouped together.

Therefore in alternative embodiments, page hit aggregating page stream sorters are included in page stream sorter 200 before each of the bins 210 (i.e., one page hit aggregating page stream sorter is included for each bin 210, located between reordering circuit 205 and each bin 210). In such embodiments, with one page hit aggregating page stream sorter included for each bin 210 and working to aggregate only requests targeting a single bank, each page hit aggregating page stream sorter may be likely to find requests that can be grouped together.

In some embodiments, to reduce read/write turnarounds on the bus between the arbiter and memory, writes are stored into a buffer located upstream of bins 210 until one of the following events occurs: (1) the buffer becomes full, (2) there is a read to the same address as one of the writes stored in the buffer, (3) a predetermined number of cycles has passed without receiving any new requests, or (4) a timeout has expired. When any of these events occurs, the buffer of write requests is emptied to the bins 210 of page stream sorter 200. Alternatively, a fully associative write back cache may provide the necessary data for the read, while the write is further deferred.

While the invention has been described with reference to exemplary embodiments, those skilled in the art will appreciate that the present invention may also be employed in a variety of different ways. It will be appreciated that the invention is intended to cover all modifications and equivalents within the scope of the following claims. Unless otherwise stated, the terms "comprising," "having," and "including" are intended to be open-ended terms of inclusion, equivalent in meaning to each other.

What is claimed is:

1. A method of reordering memory access requests, comprising:
   receiving a stream of requests to access a memory, the memory having a plurality of banks, each bank having a plurality of pages;
   buffering the requests into a plurality of bins, wherein buffering is based on a bank to be accessed by a request; and
   outputting requests from one or more of the bins to an arbiter coupled to the memory, wherein the output requests occur at least one time in an order such that data within one bank is being accessed while at least one other bank is undergoing a page switch to prepare the at least one other bank to be accessed for another one of the requests received by the arbiter, and
   wherein outputting requests comprises:
   outputting one or more requests, accessing a first page of a first bank, from a first bin until a second request accessing a second page is detected in the first bin; and
   subsequent to detecting the second request, outputting one or more requests from a second bin.

2. The method of claim 1, wherein the order is such that at least one bank is always undergoing a page switch.

3. The method of claim 1, wherein buffering the requests comprises:
   for each request received, determining at least one of a bank and a page/bank combination associated with the request; and
   buffering the request in a bin associated with at least one of the bank and the page/bank combination.

4. The method of claim 3, wherein a bin is dynamically created based on a detection of a new row/bank combination.

5. The method of claim 1, wherein the number of bins equals the number of banks, and wherein each of the plurality of bins is associated with one of the banks of the memory.

6. The method of claim 1, wherein buffering the stream of requests comprises inserting a marker in the first bin between requests accessing different pages, and wherein detecting the second request comprises detecting the marker.

7. The method of claim 1, wherein outputting requests further comprises:
   outputting one or more requests from a first bin until:
   a number of requests in the first bin equals a predetermined number; and
   an elapsed time since a request was last output from a second bin is larger than a predetermined time.

8. The method of claim 1, wherein outputting requests further comprises outputting one or more requests from a first bin until the first bin is empty.

9. The method of claim 1, wherein outputting requests further comprises:
   outputting one or more requests from a first bin until a detection of an event; and
   after detection of the event, outputting one or more requests from a second bin, wherein the second bin is chosen based on a cyclical ordering of the bins.

10. The method of claim 1, wherein outputting requests further comprises:
    outputting one or more requests from a first bin until a detection of an event; and
    after detection of the event, outputting one or more requests from a second bin, wherein the second bin is chosen based on an elapsed time since a request was last output from the second bin.

11. The method claim 1, wherein outputting requests further comprises:
outputting one or more requests from a first bin until a detection of an event; and
after detection of the event, outputting one or more requests from a second bin, wherein the second bin is chosen based on, for each bin, a total number of requests issued to the banks since a request was last output from that bin.

12. The method of claim 1, wherein outputting requests further comprises:
outputting one or more requests from a first bin until a detection of an event; and
after detection of the event, outputting one or more requests from a second bin, wherein the second bin is chosen based on feedback from a memory controller that informs the arbiter which banks are ready to accept a page switch.

13. The method of claim 1, further comprising:
prior to buffering the requests, re-mapping one or more requests such that the requests are more evenly distributed among the bins.

14. A system, comprising:
a memory having a plurality of banks, each bank having a plurality of pages;
an arbiter coupled to the memory; and
a page stream sorter coupled to the arbiter, the page stream sorter configured to:
receive a stream of requests to access the memory;
buffer the requests into a plurality of bins, wherein the buffering is based on a bank to be accessed by a request; and
output requests from one or more of the bins to an arbiter coupled to the memory, wherein the output requests occur at least one time in an order such that data within one bank is being accessed while at least one other bank is undergoing a page switch to prepare the at least one other bank to be accessed for another one of the requests received by the arbiter,
wherein outputting requests comprises:
outputting one or more requests from a first bin until a detection of an event; and
after detection of the event, outputting one or more requests from a second bin, wherein the second bin is chosen based on, for each bin, a total number of requests issued to the banks since a request was last output from that bin.

15. The system of claim 14, wherein the page stream sorter is configured to output requests by:
outputting successive groups of one or more requests, each request of a group accessing a same page of a bank, wherein each group output accesses a different bank than the last group output.

16. The system of claim 14, wherein the page stream sorter is configured to output requests by:
outputting one or more requests, accessing a first page of a first bank, from a first bin until a second request accessing a second page is detected in the first bin; and
subsequent to detecting the second request, outputting one or more requests from a second bin.

17. The system of claim 14, wherein the page stream sorter is configured to re-map the one or more requests such that the requests are more evenly distributed among the bins.

18. The system of claim 14, further comprising a graphics processor, wherein the stream of requests comprises requests from the graphics processor to access textures stored in the memory.

19. A method of reordering memory access requests, comprising:
receiving a stream of requests to access a memory, the memory having a plurality of banks, each bank having a plurality of pages;
buffering the requests into a plurality of bins, wherein the buffering is based on a bank to be accessed by a request; and
outputting successive groups of one or more requests from the one or more bins to an arbiter coupled to the memory, wherein each request of a group accesses a same page of a bank, wherein each group output accesses a different bank than the last group output, wherein while a first bank is being accessed for a first group of one or more requests from the one or more bins, performing a page switch on one or more banks associated with other bins of the one or more bins to prepare the one or more banks associated with other bins to be accessed,
wherein outputting groups of requests comprises:
outputting one or more groups of requests from a first bin until a detection of an event; and
after detection of the event, outputting one or more groups of requests from a second bin, wherein the second bin is chosen based on feedback from a memory controller that informs the arbiter which banks are ready to accept a page switch.

20. The method of claim 19, wherein a percentage of memory clocks during which data is transferred to or from the memory is maximized.

21. The method of claim 19, wherein a first successive group accessing a first bank is output from a first bin based on a page break being detected in a second bank.

22. The method of claim 21, wherein a successive group from each bin is output before another request is output from the first bin.

* * * * *

UNITED STATES PATENT AND TRADEMARK OFFICE
CERTIFICATE OF CORRECTION

PATENT NO. : 7,664,905 B2 Page 1 of 1
APPLICATION NO. : 11/592540
DATED : February 16, 2010
INVENTOR(S) : Jarosh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Seventh Day of December, 2010

David J. Kappos
*Director of the United States Patent and Trademark Office*